Oct. 10, 1939.   C. E. BASTON   2,175,820
MEANS FOR SUPPLYING CURRENT TO DIRECT CURRENT ELECTRIC MOTORS
Filed Aug. 6, 1937
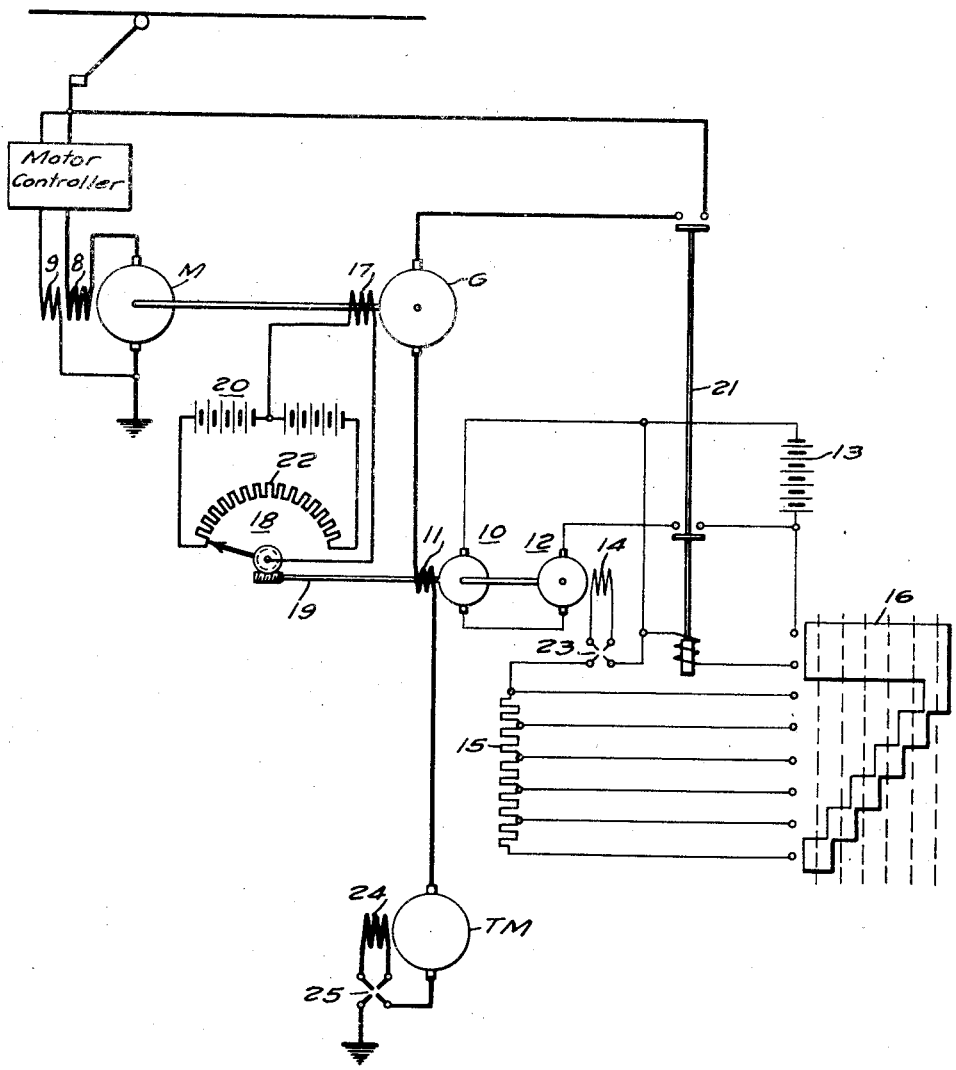
WITNESSES:
E. A. McCloskey
N. S. [signature]
INVENTOR
Cyril E. Baston.
BY
G. M. Crawford
ATTORNEY Patented Oct. 10, 1939

2,175,820

UNITED STATES PATENT OFFICE 2,175,820

MEANS FOR SUPPLYING CURRENT TO DIRECT CURRENT ELECTRIC MOTORS

Cyril E. Baston, Wilkinsburg, Pa., assignor to The English Electric Company, London, England, a British company Application August 6, 1937, Serial No. 157,656
In Great Britain September 23, 1936

7 Claims. (Cl. 172—239)

This invention relates, generally, to electric supply systems and, more particularly, to systems for regulating the current supplied to direct-current electric motors, as, for example, the traction motors of electric vehicles.

One object of the invention is to provide for automatically regulating the current in the armature circuit of an electric motor.

Another object of the invention is to provide for automatically accelerating and decelerating an electric motor at a predetermined armature current.

According to the invention, a direct-current generator in the armature circuit of a direct-current electric motor has a field winding so regulated in dependence on conditions in the motor armature circuit as to maintain, within limits, a certain predetermined condition—usually constant armature current—over a wide range of variation of motor speed and back E. M. F. By such means a motor may be accelerated automatically from rest up to a desired running speed at substantially constant current, or regeneratively braked at constant current. The generator and motor armatures may be connected in a closed circuit, the arrangement thus forming a Ward-Leonard system. Alternatively the armatures may be connected in series across a constant voltage supply, the generator voltage either assisting or opposing that of the supply.

In one simple method of practicing the invention, the main field winding of the generator is connected across a source of constant voltage in series with a rheostat which is operated automatically in accordance with the generator armature current and which comes to rest only when that current is at a predetermined value or between predetermined limits. The rheostat may be operated by an electric motor which develops a torque proportional to the generator armature current and acts against a constant biasing torque. It is an important secondary feature of the invention to use a second electric motor for developing the biasing torque which can thus be easily regulated.

It may be observed that the invention is distinct from an arrangement in which the generator has a compounding or other field winding energized proportionally to the armature current with the object of reducing the change of armature current with changes in armature circuit conditions. Such an arrangement is inherently incapable of maintaining the current independent of the circuit conditions. It is essential to the present invention that the generator excitation is not a function of the armature current.

For a fuller understanding of the nature and objects of the invention reference may be had to the following detailed description, taken in conjunction with the accompanying drawing, in which the single figure is a diagrammatic view of a control system embodying the invention.

In the particular form of the invention illustrated in the drawing, a small direct-current motor 10 has its armature connected to a source of constant voltage whereby the current through this armature is substantially constant. The field winding 11 of this motor 10 carries the armature or load current, or a shunted fraction thereof, of a direct-current generator G whereby this motor, which may be called the rheostat motor, is excited proportionally to and develops a standstill torque proportional to the generator armature current. A second small motor 12, which may be termed the biasing motor, is mechanically coupled to the first motor 10 and also has its armature current maintained constant. Preferably, in order that any disturbance in the armature circuit of one of these motors shall affect both similarly, the two armatures are connected in series across a constant potential source of supply such as a battery 13. The field winding 14 of the biasing motor 12 is supplied from a constant voltage source through a resistance regulator comprising a resistor 15 and a drum controller 16, or the like, under the control of a driver or operator.

The generator G has a separately excited field winding 17, the circuit of which includes a rheostat 18 having its operating shaft 19 coupled to the rheostat operating and biasing motors 10 and 12. The torques of these two motors act in opposition. One terminal of the field winding 17 may be connected to the mid-point of a battery 20 to permit the current in the field winding to be reversed by means of the rheostat 18.

The generator G has its armature connected in series with that of the working or traction motor TM across the external constant-voltage power supply and is driven by a motor M which may be fed from the same supply. The motor M is provided with a series field winding 8 and a shunt field winding 9. At maximum excitation, the generator voltage is substantially equal to and in opposition to the supply voltage and if, with the rheostat 18 set for this condition and the generator running at its proper speed, the circuit of the generator and motor armatures be closed by operating the controller 16 to close a switch 21, the working motor TM being at a standstill, no current will flow through this circuit.

If now the field of the biasing motor 12 be energized together with the armatures of the rheostat operating and biasing motors, a torque will be applied by the biasing motor which will move the rheostat to weaken the generator excitation. This will permit current to pass through the circuit of the generator and working motor armatures, and as a result the rheostat operating motor 10 will develop a torque. Movement of the rheostat 18 will continue until the current has increased to such a value that the torque of the rheostat motor is equal and opposite to the biasing torque of motor 12, at which time the rheostat will come to rest. This value of current will thus depend on the biasing torque and can accordingly be determined as desired by means of the field regulator of the biasing motor.

Any deviation in the generator armature current from this desired value will cause movement of the rheostat and variation in generator voltage until the current is brought back to substantially the correct value. With the working motor TM initially at standstill, the flow of current will cause the motor to accelerate and build up a back E. M. F., thus tending to decrease the armature current. Any such decrease will, however, set the generator field rheostat 18 in motion to decrease the generator E. M. F. and compensate for the increase in motor back E. M. F. In this way the working motor will be accelerated at constant current.

Should it be desired to vary the current, the excitation of the biasing motor 12 is gradually changed. Acceleration of the working motor will usually continue until the rheostat has moved as far as it can, which may be when the generator excitation, and consequently its E. M. F., is zero. If the constant current characteristic is no longer necessary, the generator may then, for economy purposes, be cut out of circuit. On the other hand, the working motor may be designed to run at its full speed on, say, twice the supply voltage and the generator will then be designed to operate on the "buck and boost" system. For this purpose, the rheostat 18 must be arranged so that movement beyond its midpoint 22, the position for zero excitation, reverses and gradually strengthens the generator field.

An increase in the generator voltage, which now adds to that of the supply, and consequent increase in voltage and speed of the working motor will continue until the rheostat has reached a limiting position and can move no farther. Any further increase in speed of the working motor, due, for example, to the load being taken off, will then cause a decrease in current and in motor torque, thereby limiting the speed which the motor can attain. On the other hand, any decrease in motor speed due to overloading will tend to increase the armature current, but this will cause backward movement of the rheostat until current is substantially back to normal.

For some purposes, especially where the working motor is a traction motor, it may be desirable to maintain a constant current up to a certain speed and thereafter to have the current fall off in such a manner that a constant horsepower is maintained. To this end, the biasing torque which the rheostat operating motor 10 has to overcome may vary automatically according to the position of the rheostat. This may be achieved mechanically by coupling the rheostat operating motor 10 and the biasing motor 12 together through suitable gearing of which the gear ratio varies according to the rheostat position or electrically by making the rheostat 18 act on the excitation of the biasing motor 12.

If, when the working motor is running at a steady speed, it be required to brake the motor regeneratively at constant current, the excitation of the biasing motor 12 of the rheostat is first of all reduced to zero, and then reversed by means of a reversing switch 23. The effect of this will be to cause backward movement of the rheostat and either a decrease in generator voltage, if it is assisting the supply, or an increase, if it is opposing the supply, until the total back E. M. F. in the circuit is greater than the forward E. M. F., at which time current will be returned to the supply.

This reversal of current will reverse the torque of the rheostat operating motor 10 so that the two motors 10 and 12 are again in opposition. Equilibrium will be reached when the opposing torques are equal and regeneration will continue at substantially constant current until the generator E. M. F. approaches a value equal and opposite to that of the supply when current will fall off to zero and the working motor will come to rest. It is necessary to reverse the field 24 of the motor TM by means of a reversing switch 25 during regeneration.

It will be appreciated that the rheostat operating and biasing motors could be combined into a single motor having one armature and two field windings. The rheostat 18 need not be directly in the circuit of the generator field winding 17, but could be in the field circuit of an exciter for the generator, or any mechanically operable device for varying the generator excitation could be used in place of the rheostat.

In applying the invention to the Ward-Leonard system, the operation of the rheostat is slightly modified. The rheostat is set initially to give substantially no excitation of the generator, and moves under the action of the biasing motor to increase the generator excitation until the opposing torque of the rheostat-driving motor, in consequence of the current flowing through the traction motor armature, has become equal to the torque of the biasing motor. Any decrease in current due to the building up of the back E. M. F. of the traction motor will allow the biasing motor to drive the rheostat in a direction to increase the generator excitation and restore current to the desired value. The action, during both acceleration and regeneration, is in other respects as already described.

The invention is applicable to the control not only of traction motors, but also of motors for driving lifts, machine tools, etc.

I do not desire to be restricted to the specific embodiment of my invention herein shown and described since it is evident that it may be changed and modified without departing from the spirit and scope of my invention as defined in the appended claims.

I claim as my invention:

1. In a power system, in combination, a traction motor, a generator for supplying current to said motor, a motor for driving said generator, means for automatically regulating the current in the generator field winding to maintain a predetermined current in the generator armature-traction motor circuit, said regulating means being responsive to the traction motor current, a resistor for controlling the operation of said regulating means and a manually operable controller for shunting said resistor to adjust said regulating means to vary the regulated current, and means for reversing the action of said regulating means, whereby said traction motor may be accelerated or regeneratively braked.

2. In a power system, in combination, a traction motor, a generator for supplying current to said motor, a motor for driving said generator, a source of substantially constant potential for energizing the field winding of said generator, means for controlling the current in the generator field winding, means for operating said controlling means, said operating means having an adjustable biasing element and an operating element responsive to the traction motor current, thereby regulating the current in the traction motor circuit, and means for adjusting said biasing element independently of the generator potential to vary the regulated current.

3. In a power system, in combination, a traction motor, a generator for supplying current to said motor, a motor for driving said generator, a source of substantially constant potential for energizing the field winding of said generator, a variable rheostat for controlling the current in the generator field winding, opposing torque means for operating said rheostat, said torque means having an operating element and a biasing element, said operating element being responsive to the traction motor current, thereby regulating the current in the traction motor circuit, and means for varying the torque of said biasing element opposing said operating element to vary the regulated current.

4. In a power system, in combination, a traction motor, a generator for supplying current to said motor, a motor for driving said generator, a source of substantially constant potential for energizing the field winding of said generator, a variable rheostat for controlling the current in the generator field winding, opposing torque motors for operating said rheostat, one of said motors being responsive to the traction motor current, thereby regulating the current in the traction motor circuit, and means for adjusting the torque of the other motor to vary the regulated current, said torque motors having their armature windings connected in series-circuit relation.

5. In a power system, in combination, a traction motor, a generator, a motor for driving said generator, a source of power for said driving motor, said traction motor being connected across said power source in series with said generator, a separate source of power for energizing the field winding of the generator, and means responsive to the traction motor current for controlling the excitation of said generator to maintain a predetermined current in the traction motor circuit.

6. In a power system, in combination, a traction motor, a generator, a motor for driving said generator, a source of power for said driving motor, said traction motor being connected across said power source in series with said generator, a separate source of power for energizing the field winding of the generator, and means for regulating the current in the field winding of said generator to maintain a predetermined current in the traction motor circuit, said regulating means being responsive to the traction motor current.

7. In a power system, in combination, a traction motor, a generator, a motor for driving said generator, a source of power for said driving motor, said traction motor being connected across said power source in series with said generator, a separate source of power for energizing the field winding of hte generator, and means for regulating the current in the field winding of said generator to maintain a predetermined current in the traction motor circuit, said regulating means being responsive to the traction motor current and operable to cause the generator voltage to either oppose or add to the voltage of said power source.

CYRIL E. BASTON.